(12) United States Patent
Linnman (10) Patent No.: US 7,860,173 B2
(45) Date of Patent: Dec. 28, 2010

(54) COMMON FIELD BUS FOR DATA AND ENERGY TRANSFER

(75) Inventor: Sven Linnman, Åkersberga (SE)

(73) Assignee: Handinter Gamma AG, Sarnen (CH)

( * ) Notice: Subject to any disclaimer, the term of this patent is extended or adjusted under 35 U.S.C. 154(b) by 993 days.

(21) Appl. No.: 10/551,910

(22) PCT Filed: Apr. 7, 2004

(86) PCT No.: PCT/SE2004/000564

§ 371 (c)(1), (2), (4) Date: Feb. 9, 2007

(87) PCT Pub. No.: WO2004/090833

PCT Pub. Date: Oct. 21, 2004

(65) Prior Publication Data

US 2007/0143508 A1 Jun. 21, 2007

(30) Foreign Application Priority Data

Apr. 14, 2003 (SE) .................................... 0301131

(51) Int. Cl.
*H04B 3/00* (2006.01)
(52) U.S. Cl. ...................................... 375/257; 375/222
(58) Field of Classification Search .................. 375/259, 375/242, 257, 222
See application file for complete search history.

(56) References Cited

U.S. PATENT DOCUMENTS

| 4,139,737 A | | 2/1979 | Shimada et al. |
| 4,460,598 A | | 7/1984 | Lautenschläger et al. |
| 4,477,896 A | | 10/1984 | Aker |
| 5,724,371 A | * | 3/1998 | Magne et al. .................. 372/6 |

FOREIGN PATENT DOCUMENTS

| DE | 19946776 A1 | 4/2001 |
| EP | 0695055 A2 | 1/1996 |

\* cited by examiner

*Primary Examiner*—Emmanuel Bayard
(74) *Attorney, Agent, or Firm*—Holland & Bonzagni, P.C.; Mary R. Bonzagni, Esq.

(57) ABSTRACT

Data communication in an electrical system according to the present invention uses the time difference between two successive current or voltage pulses to represent different data values. The time differences ($\Delta t9 - \Delta t16$) can assume more than two different predetermined values, and thereby each pulse can represent more than one data bit. A central unit of the inventive system transfers data to a number of nodes by modulating voltage pulses onto a base voltage supplying power to the nodes. The time difference ($\Delta t9 - \Delta t12$) between successive voltage pulses represents a data value. The nodes transfer data back to the central unit using current pulses, whereby the time difference ($\Delta t13 - \Delta t16$) between the latest voltage pulse and the current pulse represents the data sent to the central unit. Data from two or more nodes are possible to transfer simultaneously without disturbing each other. The base voltage on the bus can be AC or DC.

18 Claims, 9 Drawing Sheets

| MAIN PULSE PERIOD | 1 | 2 | 3 | 4 | 5 | 6 | 7 |
|---|---|---|---|---|---|---|---|

FRAME 1

| | 1 | 2 | 3 | 4 | 5 | 6 | 7 |
|---|---|---|---|---|---|---|---|
| FROM CENTRAL UNIT | ADDR | ADDR | DATA | DATA | DATA | DATA | CAL |
| FROM NODES | EXPR | EXPR | DATA | DATA | DATA | DATA | CHCK |

FRAME 2

| | 1 | 2 | 3 | 4 | 5 | 6 | 7 |
|---|---|---|---|---|---|---|---|
| FROM CENTRAL UNIT | | | | | | | |
| FROM NODES | | 5 | | | | | |

FRAME 3

| | 1 | 2 | 3 | 4 | 5 | 6 | 7 |
|---|---|---|---|---|---|---|---|
| FROM CENTRAL UNIT | GRP | 5 | | | | | |
| FROM NODES | | | 6 | | | | |

FRAME 4

| | 1 | 2 | 3 | 4 | 5 | 6 | 7 |
|---|---|---|---|---|---|---|---|
| FROM CENTRAL UNIT | IND | 56 | 1 | | | | |
| FROM NODES | | 6 | | | | | |

FRAME 5

| | 1 | 2 | 3 | 4 | 5 | 6 | 7 |
|---|---|---|---|---|---|---|---|
| FROM CENTRAL UNIT | GRP | 6 | | | | | |
| FROM NODES | | | 3 & 7 | | | | |

FRAME 6

| | 1 | 2 | 3 | 4 | 5 | 6 | 7 |
|---|---|---|---|---|---|---|---|
| FROM CENTRAL UNIT | IND | 63 | 1 | | | | |
| FROM NODES | | | | | | | |

FRAME 7

| | 1 | 2 | 3 | 4 | 5 | 6 | 7 |
|---|---|---|---|---|---|---|---|
| FROM CENTRAL UNIT | IND | 67 | 1 | | | | |
| FROM NODES | | 4 & 5 | | | | | |

FRAME 8

| | 1 | 2 | 3 | 4 | 5 | 6 | 7 |
|---|---|---|---|---|---|---|---|
| FROM CENTRAL UNIT | GRP | 4 | | | | | |
| FROM NODES | | | 2 | | | | |

FRAME 9

| | 1 | 2 | 3 | 4 | 5 | 6 | 7 |
|---|---|---|---|---|---|---|---|
| FROM CENTRAL UNIT | IND | 42 | 1 | | | | |
| FROM NODES | | | | | | | |

FRAME 10

| | 1 | 2 | 3 | 4 | 5 | 6 | 7 |
|---|---|---|---|---|---|---|---|
| FROM CENTRAL UNIT | GRP | 5 | | | | | |
| FROM NODES | | | 1 | | | | |

FRAME 11

| | 1 | 2 | 3 | 4 | 5 | 6 | 7 |
|---|---|---|---|---|---|---|---|
| FROM CENTRAL UNIT | IND | 51 | 1 | | | | |
| FROM NODES | | | | | | | |

COMMON FIELD BUS FOR DATA AND ENERGY TRANSFER

TECHNICAL FIELD

The present invention relates in general to distribution of control signals and electrical power in an electrical system, and in particular to distribution of control signals between a central unit and a number of nodes over the conductor that powers the nodes.

BACKGROUND

Today, there are several data buses or field buses that are intended to distribute control signals between a central unit, also called a "master", and several nodes, also called "slaves". A number of these field buses make use of only one conductor pair to distribute both control signals, in the shape of data pulses, and electrical energy, for operating the nodes and their peripheral units. One typical example is presented in the U.S. Pat. No. 4,139,737. Here, a pulse train of square pulses is superimposed on a supply voltage.

In prior art field buses that transfers data and energy on the same conductor pair, different pulse trains are sent over the bus to transfer data. This data is interpreted as addresses to different nodes, as identities of different information packages, as instructions or control signals or as measurement values or status information from nodes. In most prior art pulse trains, each pulse or each time slot is used to transfer one data bit, i.e. the information is normally in a binary form. During the pulse or time slot, the voltage or current on the bus is either high or low, representing either a data bit with the value 1 or 0, respectively. Alternatively, pulses having different duration can represent different digital values.

The U.S. Pat. No. 4,477,896 is another typical example of a system utilising transmission of data and power over the same conductor pair. Information from a base unit to nodes is sent as time divided voltage pulses. Information from nodes to the base unit is instead represented as time divided multiplexed current pulses. The voltage signals are preferably superimposed on a DC potential, which is used as a power source for the nodes.

Prior art systems of this kind are favourable in many respects, e.g. since they reduce the need for multiple parallel control signal wiring. However, a number of disadvantages still remains. One problem is that the pulse duration occupies a relative large portion of the total time. During the pulses, the ability of the bus to transfer energy, i.e. the efficiency in powering of the nodes, is detrimentally affected. The powering arrangement therefore has to be deliberately overdimensioned to compensate for this lower efficiency.

In the published patent application DE 38 28 271, a telegram transmission system is disclosed using a pulse position modulation. A time difference between short square pulses is interpreted in terms of data of typically more than one bit. Slave units are also powered by the communication bus.

Another problem is connected with the use of field buses in environments that are sensitive for electromagnetic radiation. The use of frequently occurring substantially square-shaped pulses gives rise to relatively large amounts of electromagnetic radiation. Depending on the used pulse frequency, the radiated energy appears in different frequency ranges. Since the square pulses furthermore involves a relative large portion of high-frequency overtones, radio frequency disturbances are to be expected in many cases. In environments sensitive to such disturbances, the emission of electromagnetic energy from the data bus may cause large problems.

The digital data is in prior art systems typically transmitted as relative long sequences of pulses, where the voltage value at a certain time has a certain meaning. The emission of the pulses is typically controlled by a clock device in the sending unit. The interpretation in the receiving end is analogously strongly dependent on that the receiving unit has basically the same definition of time. The receiving unit thus has to have a clock device with a stability that is accurate enough to ensure a correct interpretation of the pulses during the entire pulse sequence. However, accurate clock devices are relatively expensive and this causes a problem when very simple and inexpensive nodes are to be connected.

In DE 199 46 776, simultaneous bi-directional communication between two units is disclosed. The data to be transferred is modulated as binary data. Amplitude modulated voltage pulses are used for transferring binary data in one direction, and amplitude modulated current pulses are used for transferring binary data in the opposite direction. However, the disclosure is limited to two communicating units, and can not in an obvious manner be modified to multi-node systems.

A typical communication between the central unit and the more than one remote nodes takes place at the command of the central unit. In a typical signalling procedure, the central unit first sends out an address to a node to be contacted. Then, an amount of data may be sent from the central unit to the addressed node. The node may then respond, e.g. by a confirmation. Only the addressed node has this possibility, since there cannot exist any simultaneous signalling from more than one node at a time. The nodes have in a typical case no or at least small possibilities to initiate a communication with the central unit at its own initiative. This may cause problems when emergency situations occur. If an emergency situation occurs at a node, the node has to wait for the central unit to address it, before any message of the emergency situation can be transferred. If the central unit serves a large number of nodes, it may take a long time between each successive addressing.

SUMMARY

A general object of the present invention is to provide improved methods and devices for signalling and powering on a common bus. An object of the present invention is to provide methods and devices for signalling and powering on a common bus having a higher power transferring capability during data transfer. Another object of the present invention is to provide such methods and devices presenting a reduced emission of electromagnetic radiation. Yet another object of the present invention is to provide such methods and devices that are operable with reduced demands of clock stability. It is also an object of the present invention to provide such methods and devices enabling a fast transmission of express messages from any remote node.

The above objects are achieved by methods and devices according to the enclosed patent claims. In general, the present invention uses the time difference between two successive voltage pulses to represent different data values. The time differences can assume more than two different predetermined values, and each pulse can thereby represent more than one data bit. This is a variation of a pulse position modulation. A central unit transfers data to more than one remote node by modulating voltage pulses onto a base voltage, which also provides electrical power to the nodes. The time difference between successive voltage pulses represents a data value. The nodes transfer data back to the central unit using current pulses and a voltage pulse reference, whereby the time difference between the latest voltage pulse and the current pulse represents the data sent to the central unit. Data from two or more nodes are preferably allowed to be transferred simultaneously without disturbing each other. A time difference between two successive voltage pulses having a value within a predetermined regions of values, e.g. above a predetermined threshold value, can preferably be used as indication of a frame start and/or end as well as a time reference calibration. Since only the time position of the pulse is of importance for the interpretation of the data content, almost any pulse shape can be used. Preferably, the pulses used for data transmission have a shape involving as small overtone content as possible. Preferred pulse shapes are based on triangular or sinusoidal shapes. The base voltage on the bus can be AC or DC.

Since data is transferred utilising a smaller number of pulses than in binary modulation and since the pulse shape preferably is selected to give rise to a small overtone contribution, the amount of electromagnetic radiation emitted from the bus is significantly reduced. The remaining emitted electromagnetic radiation is also of a more stochastic type, which will appear more as a random noise than interfering electromagnetic signals. Furthermore, the reduced number of pulses also increases the efficiency of the bus as a power distribution means. Due to time calibration routines that are easy to implement and are occurring relatively frequently, the demands for the stability of clock devices are reduced. This in turn permits simpler and more inexpensive clock devices to be used. The possibility to transfer data simultaneously from more than one node at a time without destroying the data content of each other opens up for fast express messages to be sent in the bus system, as well as for fast arbitration between nodes requesting to send data.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present invention, the bus used is characterised as a conductor pair, between which a certain voltage is provided. Current pulses are furthermore transferred on preferably one of the conductors. Anyone skilled in the art realises that also a single conductor combined with grounding of the different components will have a similar behaviour. In the expression "conductor pair" is therefore also included the case where one conductor is ground.

Figure 1:
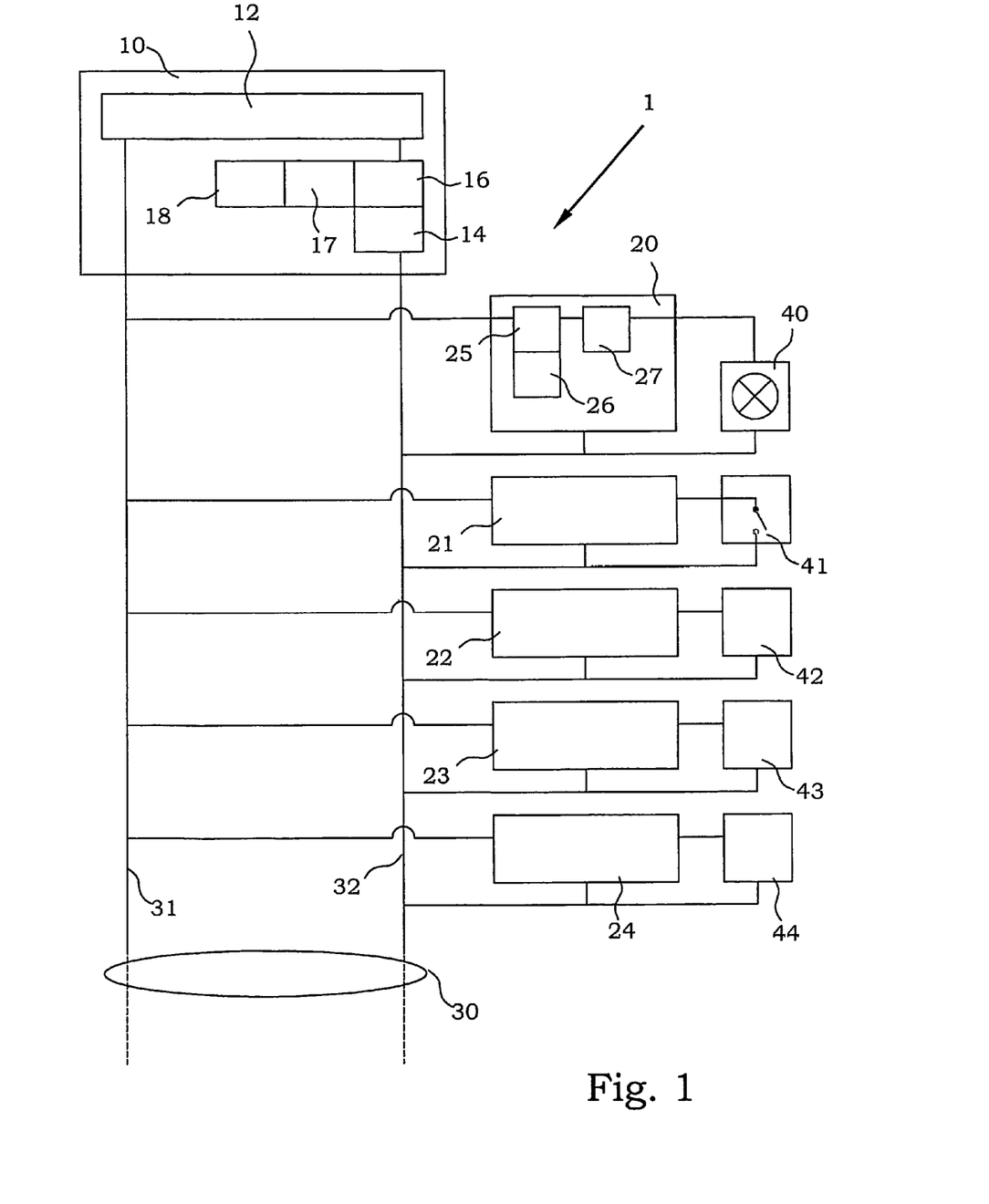
FIG. 1 is a block scheme of an embodiment of an electrical system according to the present invention.

In FIG. 1, an electrical system 1 is schematically illustrated as a block diagram. The electrical system 1 comprises one central unit 10 and a number (>1) of remote nodes 20-24, in this case 5 nodes. The remote nodes 20-24 are connected to an electrical bus 30 comprising a pair of conductors 31, 32. The bus 30 is in turn connected to the central unit 10. Each node 20-24 is associated with at least one peripheral unit 40-44. The node 20-24 is thereby responsible for monitoring and/or controlling of the associated peripheral unit 40-44. For instance, node 20 controls the power to the peripheral unit 40 and node 21 senses the position of the switch 41. The central unit 10 is arranged to co-ordinate the operations of the different nodes 40-44, i.e. sending control messages to the node and/or receiving data concerning the nodes, e.g. status or any measured quantities.

The central unit comprises a voltage source 12 connected to apply a base voltage between the conductors 31, 32 of the bus 30. The nodes 20-24 and the peripheral units 40-44 have thereby a possibility to obtain necessary operation power from the bus 30.

The central unit 10 further comprises a voltage modulator 14. The voltage modulator 14 is arranged to modulate voltage pulses between the two conductors 31, 32. The time difference between successive ones of these voltage pulses represents data to be transferred from the central unit 10 to the nodes 20-24. The nodes 20-24 analogously comprise detectors 25 for identifying the modulated voltage pulses. The time difference between successive voltage pulses is determined and an interpreter 26 interprets the time difference as data. The detector 25 can of course comprise a detector that actually measures another quantity than voltage, but where simple relations known by anyone skilled in the art directly relate this quantity to voltage. For instance, current through a known load connected between the bus connectors could be used as an "indirect" voltage detector.

In a preferred embodiment, the nodes 20-24 are also allowed to transfer data back to the central unit 10. The nodes 20-24 therefore comprise current pulse means 27, which are arranged to enable introduction of current pulses on the conductors 31, 32. The time difference between the closest previous voltage pulse from the central unit and these current pulses represents data to be transferred from the remote nodes 20-24 to the central unit 10. Analogously, the central unit 10 comprises a current detector 16, means 17 for determining the time difference between the closest previous voltage pulse created by the central unit 10 and these current pulses and associating means 18, interpreting the time differences as data.

As mentioned above, communication according to the present invention uses a varying time difference between two successive pulses to transfer data from the central unit to the nodes. The time distance can assume more than two discrete or distinct pre-determined values. This is in other words a modulation based on pulse position differences. By combining this type of pulse position modulation for data transfer with a simultaneous transfer of electrical energy, large advantages can be achieved compared with prior art arrangements. Large amounts of data can be transferred without reducing the ability of the bus to supply electrical energy to the nodes and peripheral units. Furthermore, the emitted electromagnetic energy is reduced, which reduces electromagnetic disturbances caused by the data transfer.

Figure 2:
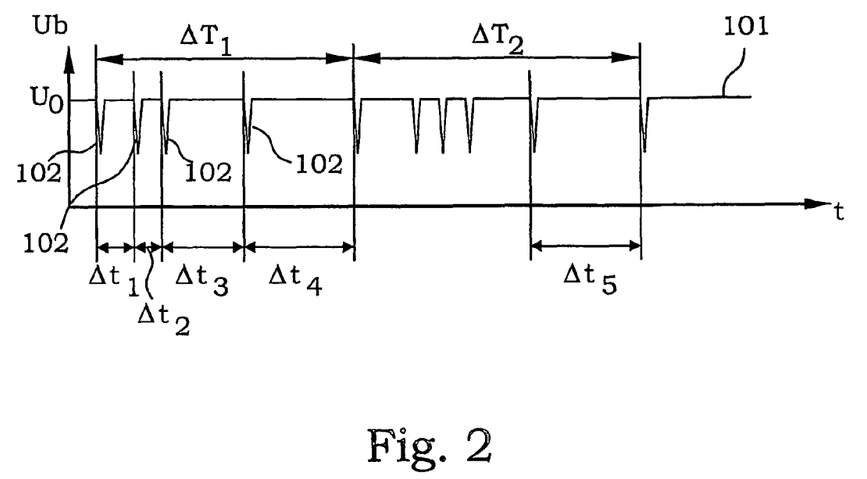
FIG. 2 is a diagram illustrating voltage pulses according to an embodiment of the present invention.

A first embodiment of a communication scheme is described in connection with the diagram of FIG. 2. Here, a voltage signal $U_b$ is provided between the conductors of the communication and powering bus. The base voltage used for powering purposes is in this embodiment a DC voltage of a nominal value of $U_0$. In FIG. 2, the time variation of the voltage signal in a time interval is illustrated by the curve 101. In the present embodiment, data is transferred in frames or pulse trains on the bus between the central unit and the nodes. The curve 101 presents two complete frames lasting for 47 and 53 time units, respectively. In the present embodiment, the time unit used is 1 ms, whereby the frames last $\Delta T_1$=47 ms and $\Delta T_2$=53 ms, respectively. The total frame duration is in this embodiment evidently not constant.

The central unit provides a number of main voltage pulses 102 on the bus. During the main pulses 102, the voltage on the bus is in this embodiment lower than during the remaining time of the frame. The time distance between the falling pulse edges of the main pulses 102, hereinafter called main pulse period, represents one data unit of more than one binary bit. In the present embodiment, the first frame comprises 4 main pulse periods $\Delta t_1$–$\Delta t_4$. The first three periods $\Delta t_1$–$\Delta t_3$ corresponds to one data unit each. In this embodiment, the main pulse periods may vary between 4 ms and 19 ms, in steps of 1 ms, which means that 16 different values are available. One data unit thus represents 4 binary bits ($2^4$=16). The first main pulse period $\Delta t_1$ is 7 ms long, which corresponds to a number "3". The second main pulse period $\Delta t_2$ is 5 ms long, which corresponds to a number "1" and the third main pulse period $\Delta t_3$ is 15 ms long, which corresponds to a number "11".

The frames are terminated by a relatively long main pulse period $\Delta t_4$, which exceeds the duration of any other main pulse period containing ordinary data. This long main pulse period $\Delta t_4$ is a calibration pulse period and is in this embodiment added in the end of each frame. The duration of the calibration pulse period is in this case always 20 ms. The main pulse period $\Delta t_5$ is thus also 20 ms. The characteristic feature of a calibration pulse period is in this embodiment that it exceeds a predetermined duration, in this embodiment 19.5 ms.

In other embodiments of the present invention, the calibration pulse period can be characterised in other ways, e.g. being shorter than a predetermined duration or having a duration within a predetermined range of durations.

The calibration pulse period may be used for several purposes. The first purpose is to label the end of the frame. Any receiving device can then treat any successive pulses as belonging to a new frame. The voltage pulse ending the calibration pulse period therefore also serves as a synchronising pulse. In this embodiment, the subsequent frame starts with this ending voltage pulse of the calibration pulse period. In a general case, depending on the actual communication procedure used, a new frame starts with the m:th voltage pulse following a calibration pulse period. In this embodiment m=1. By doing this, frames with varying number of data units can be used. For instance, the frame corresponding to $\Delta T_2$ has four data units.

The calibration pulse period can also, as the name indicates, be used for calibration purposes. In the embodiment of FIG. 2, the calibration pulse period has always the same duration. This enables any node to measure the time of this period and adjust its time references in such a way that this measured time corresponds to the nominal one. In this way the node time reference is adjusted to the central unit time reference. If the calibration pulse period is transmitted fairly frequently, perhaps tenth of times every second, the demands of the stability of the node time measuring means may be mitigated. The time measuring means may be allowed to vary over longer times or over different surrounding temperatures. The oscillators controlling the time measurement in the nodes are not needed to be built on expensive crystal or ceramic resonators. Instead, inexpensive RC oscillators can be used, without high demands on component stability. Often, an oscillator having frequency controlling components integrated directly with other components in an integrated circuit may be used. This gives a significant cost reduction in comparison with prior art.

In other embodiments, the calibration period does not have to be included in every frame. It may e.g. be decided that calibration periods only are sent every 10th or 100th frame. This saves some data transmitting capacity to be used for useful data units instead. This is easily implemented in embodiments where each frame has a predetermined number of data units. However, by starting each frame with a data unit specifying the actual number of total data units following in the present frames, also varying frame length systems can use occasionally occurring calibration periods.

The energy transfer can be provided by constant voltages or by means of alternating voltages. Every disruption or pulse of this voltage means that the energy transfer capability is reduced. It also means that the electromagnetic disturbances emitted from the bus increases. Both these disadvantages are minimised by devices and methods according to the present invention, since the number of voltage disruptions or pulses can be reduced significantly. The reason for this is that each pulse can carry information of significantly more than one binary bit, which is more than in normal binary modulation systems.

The fact that the pulses on the bus are situated at different time distances implies by itself an advantage. Any electromagnetic disturbances from the pulses of the bus then assume characteristics of more or less stochastic noise instead of continuous disturbance frequencies.

The content of the frame can be formatted according to different schemes. One possibility is to let the first data unit define an address of a node to which the remaining data units are intended for. The addressed node can detect the address and then assimilate the following data. Nodes that are not addressed can remain listening to the voltage pulses, but not extracting the data contained therein. Anyone skilled in the art understands that there might be many different possible variations of the actual format of the data communication.

Figure 3:
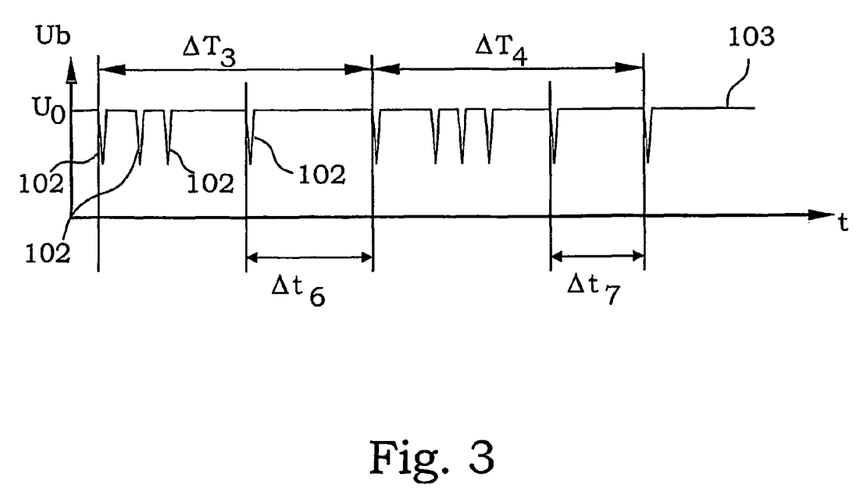
FIG. 3 is a diagram illustrating voltage pulses according to another embodiment of the present invention.

FIG. 3 illustrates a curve 103 of voltage pulses according to another embodiment of the present invention. In this embodiment, each frame has a constant duration. $\Delta T_3$ and $\Delta T_4$ are in this case both 54 ms long. The calibration periods $\Delta t_6$ and $\Delta t_7$ are instead of varying duration. The identification of $\Delta t_6$ and $\Delta t_7$ as calibration periods are, however, still possible since the duration exceeds the predetermined threshold of 19.5 ms. Synchronisation can then also be performed. Any calibration of node time references is in the present embodiment performed using the entire length of the frame, not the actual duration of the calibration period. The calibration period thus serves the main purpose of filling up the frame length to the predetermined duration.

Figure 4:
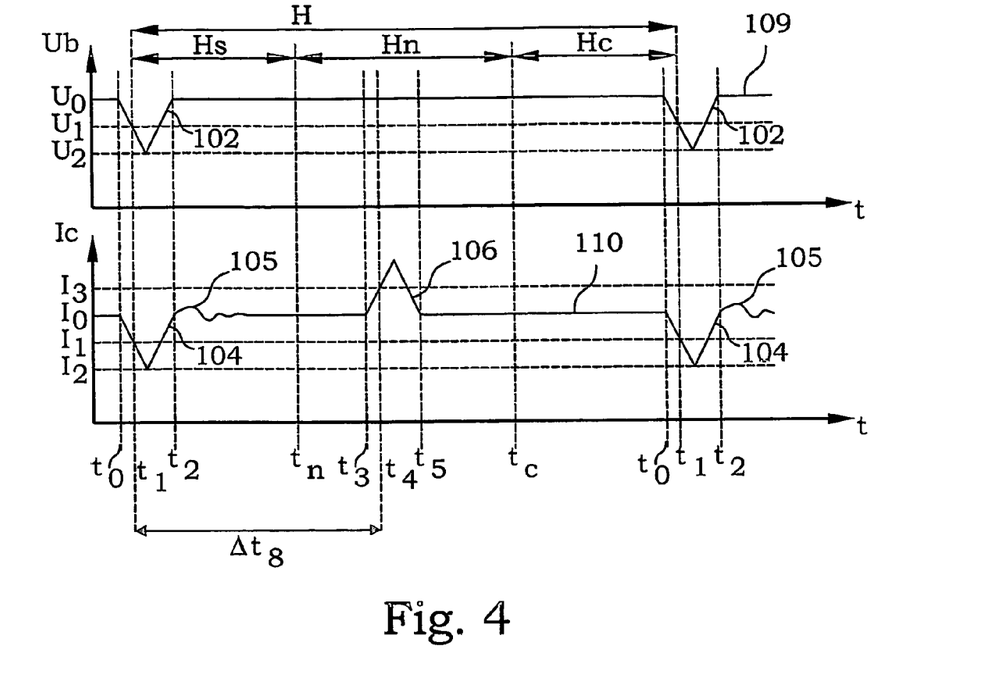
FIG. 4 is a diagram illustrating voltage and current pulses according to an embodiment of the present invention.

The voltage pulses 102 described above are used for transferring data from the central unit to different nodes. The central unit therefore generates the voltage pulses 102 on the bus. FIG. 4 illustrates diagrams of curves of voltage 109 and current 110 in the bus during a main voltage pulse 102 generated by the central unit. In this embodiment, the voltage pulse 102 has a triangular shape. The voltage pulse 102 starts at time $t_0$, having the value of $U_0$. The voltage is reduced linearly and passes the voltage $U_1$ at time $t_1$. After a minimum at $U_2$, the voltage is again raised linearly and the pulse ends at $t_2$. Preferably, the first crossing of $U_1$, i.e. at the falling edge, is used as defining the position of the pulse. The triangular shape of the pulse has certain advantages compared with square pulses, since square pulses give rise to larger amounts of high-frequency overtones in the emitted electromagnetic spectrum. Even more rounded-off pulse shapes would give even better radiation behaviour, but will at the same time increase the complexity of the pulse forming devices.

When the central unit decreases the voltage of the bus, also the current flowing in the bus will decrease, as indicated by the current curve 110, i.e. a current pulse 104 is also created. If dominantly resistive loads are present, the current pulse 104 will have basically the same shape and timing as the voltage pulse 102. An average current before the pulse 104, $I_0$, is reduced to $I_2$ at the minimum voltage $U_2$, passing $I_1$ at the pulse position $t_1$.

Up to now, only transferring of data from the central unit to the nodes has been discussed. However, the present invention also allows for "upbus" data communication, i.e. transferring of data from the nodes to the central unit. According to the present invention, data is transferred from the nodes to the central unit by using current pulses with a voltage pulse reference. A node is according to the present invention allowed to during a short time increase or decrease the load on the bus. Such a fast change of the bus load will give rise to a positive or negative current pulse, respectively, on the bus. The main voltage pulse generated by the central unit may still be used as a time reference, and a time difference between the main voltage pulse and the generated current pulse may represent a certain data value in analogy with earlier discussions.

FIG. 4 illustrates voltage and current curves 109, 110 caused by an explanatory embodiment. A main pulse distance H between two successive main voltage pulses 102 has been divided into three parts, Hs, Hn and Hc. (The main pulse distance H corresponds to the periods $\Delta T_1$ to $\Delta T_4$ in FIGS. 2 and 3.) During Hc, one may expect data from the central unit, i.e. next main voltage pulse 102. The minimum duration of a main voltage period is thus $t_c$, according to earlier discussions. (In FIGS. 2 and 3, $t_c$ was equal to 4 ms.) The part Hs is used by the nodes to change the current that is supplied to the peripheral units of the nodes. The damped oscillation behaviour 105 of the current curve 110 illustrates the result of such a change of the bus load and is believed to be negligible at time $t_n$. By not allowing for any significant changes of the bus load during the period Hn, i.e. between $t_n$ and $t_c$, the current from the bus generator will during this period be substantially constant.

According to an embodiment of the present invention, the node that is last addressed is allowed to change its load towards the bus during the period Hn. This will give rise to a current pulse 106 on the bus. In FIG. 4, the load is increased, starting at time $t_3$, and ending at $t_5$. A position of the generated current pulse 106 can be defined as $t_4$. The node controls the position in time of the current pulse 106. The current pulse 106 should be situated within the period Hn, have a specific time distance $\Delta t_8$ from the main voltage pulse 102 and represent the data value to be transferred.

Other embodiments may have the addressing of a node in a determined previous frame, i.e. the addressed node has a certain time available before the answer is sent.

The time distance $\Delta t_8$ is as mentioned above a function of the data that the node is to be sending. The minimum duration of $\Delta t_8$ is $t_n$. If the node for instance wants to send data corresponding a value of 1, the current pulse is created at $t_n+1*10$ μs. (In this example, each discrete current pulse position is separated by 10 μs.) If the value is intended to be 7, the current pulse is instead created at $t_n+7*10$ μs.

The central unit senses when the above described fast changes of the bus current passes a predetermined value, i.e. the moment $t_4$. It also measures the time elapsed between the time $t_1$ of the main voltage pulse starting the main period and the time $t_4$. This time is interpreted in the central unit as a corresponding data value.

Figure 5:
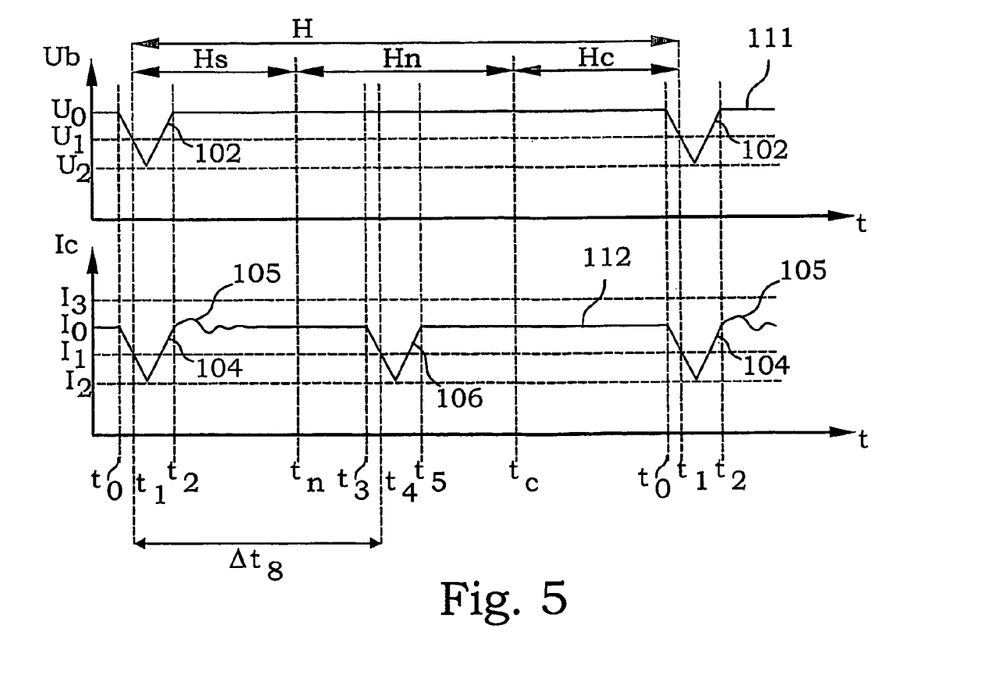
FIG. 5 is a diagram illustrating voltage and current pulses according to another embodiment of the present invention.

FIG. 5 illustrates the voltage and current curves 111, 112 of pulses created by another embodiment of the present invention. In this embodiment, the node decreases its load towards the bus, whereby negative current pulses 106 instead are created.

Analogously, the voltage pulses created by the central unit can in alternative embodiments be positive.

Figure 6:
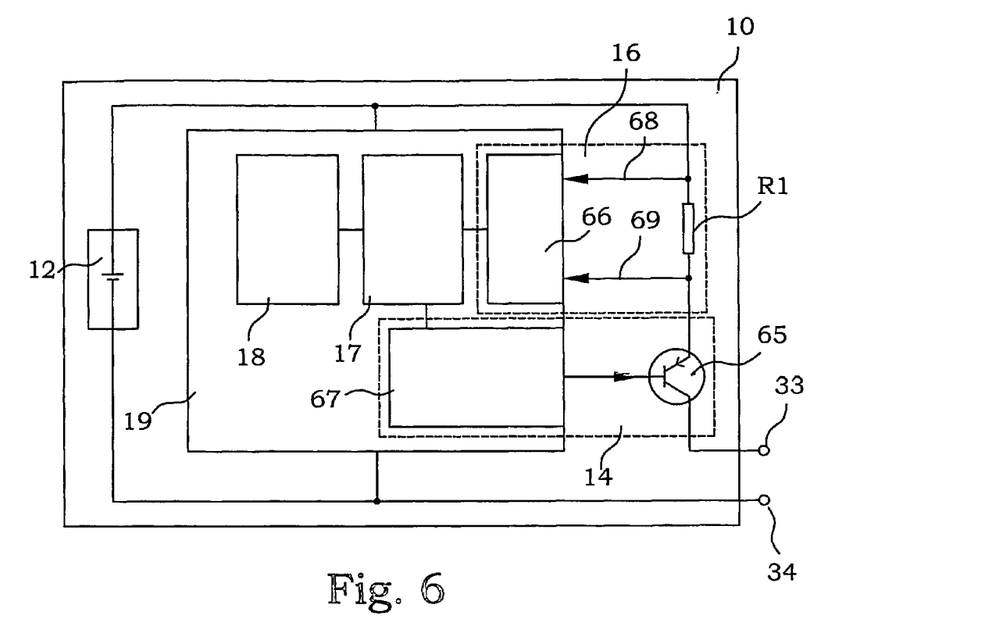
FIG. 6 is a block diagram of an embodiment of a central unit according to the present invention operating with constant voltage supply.

FIG. 6 illustrates a block scheme of an embodiment of a central unit 10 according to the present invention. The central unit 10 comprises a voltage source 12, in this embodiment a battery, which supplies power to the operation of the central unit itself as well as to the bus for further transfer to the nodes. The most essential part of the central unit 10 is a microcontroller 19. The microcontroller 19 is powered from the voltage source 12. An output control signal means 67 in the microcontroller 19 is arranged to provide a signal to a transistor 65. The transistor 65 becomes conducting by the signal and connects the voltage of the battery 12 over bus terminals 33 and 34. The voltage modulator 14 comprises in this embodiment the transistor 65 and the output control signal means 67 of the microcontroller 19.

The current that is provided out on the bus passes a shunt resistor R1. By connecting input terminals 68, 69 of a voltage detecting means 66 in the microcontroller 19 to points on each side of the shunt resistor R1, a voltage drop over the shunt resistor R1 can be measured, which is proportional to the current on the bus. The current detector 16 comprises in this embodiment the shunt resistor R1 and the voltage detecting means 66 of the microcontroller 19. In this embodiment, the microcontroller 19 further comprises the means 17 for detecting the time difference associated with the detected current pulses as well as the associating means 18, interpreting the time differences as data.

Figure 7:
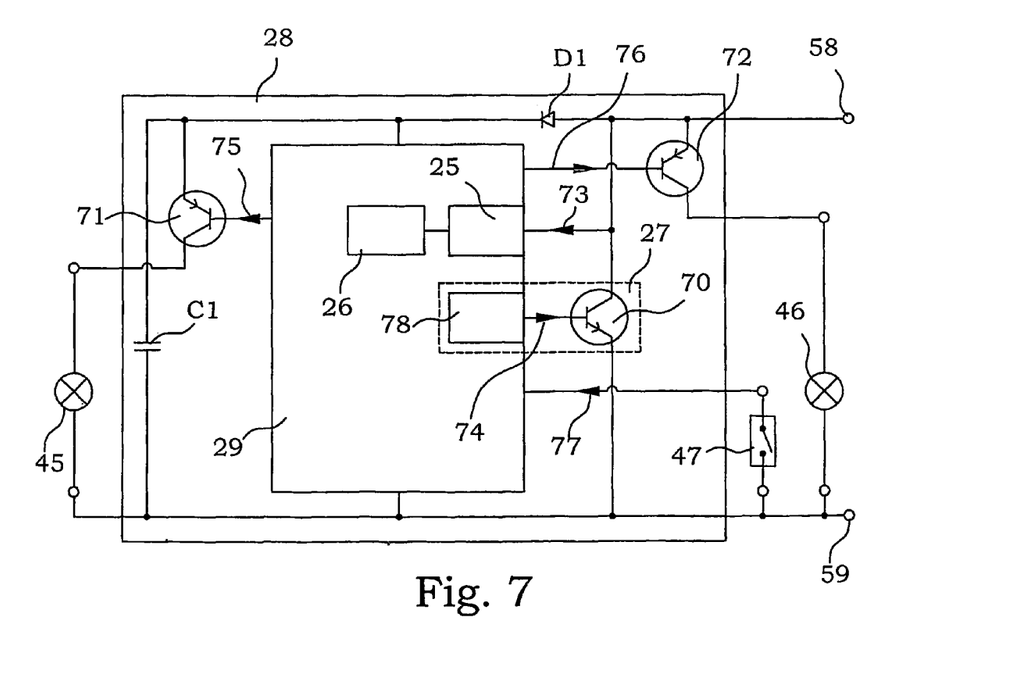
FIG. 7 is a block diagram of an embodiment of a node according to the present invention operating with constant voltage supply.

FIG. 7 illustrates a block scheme of an embodiment of a node 28 according to the present invention. The details of the node design are dependent also on the type of peripheral unit that is connected. In order to describe some different alternatives, the model node 28 of FIG. 7 is provided with three peripheral units; a peripheral unit 45 demanding constant voltage supply at all instances, a peripheral unit 46 demanding voltage supply, but with less stability requirements and a peripheral unit 47 not demanding any supply of voltage.

The main part of the node 28 is constituted by a microcontroller 29. Current from a capacitance C1 is supplied to the microcontroller 29. The capacitance C1 is charged from the bus via a diode D1. This charging current necessary to drive the microcontroller 29 is negligible in comparison to other currents extracted from the bus.

An input 73 of a voltage detecting means 25 in the microcontroller 29 is connected to the bus by bus terminals 58, 59 in order to sense the modulated voltage pulses and determine the time differences there between.

The voltage detecting means 25 is in turn connected to an interpreter means 26, also implemented in the microcontroller 29 in this embodiment. These microcontroller part means are thus responsible for detecting data sent from the central unit.

An output control signal means 78 in the microcontroller 29 is arranged to provide a signal to a transistor 70 via an output 74. The transistor 70 becomes conducting by the signal and loads the bus with a current. The output control signal means 78 can control the transistor 70 to extract different currents from the bus. The current pulse means 27 comprises in this embodiment the transistor 70 and the output control signal means 78 of the microcontroller 29.

A transistor 71 is controlled by the microcontroller 29 via an output 75. This transistor 71 is used to provide energy to the peripheral unit 45. When the transistor 71 is made conducting, full voltage is provided to the peripheral unit 45 even during periods when the bus voltage is low, due to the use of the diode D1 and capacitance C1. This corresponds to a more traditional way to provide voltage to peripheral units. The size of the capacitance C1 should be selected in proportion to the energy amount that should be transferred during the periods when the bus voltage is low.

A transistor 72 is controlled by the microcontroller 29 via an output 76. This transistor 72 is used to provide energy to the peripheral unit 46. In this case, the energy is provided to the peripheral unit 46 essentially directly from the bus, just passing the transistor 72. An advantage with such a powering principle is that no energy is lost due to any passage of a diode. If the peripheral unit 46 can accept the short periods of low voltages on the bus caused by the data transfer, this solution is more power efficient. If only such peripheral units are connected to the node, the demands on the capacitance C1 are entirely determined by the microcontroller 29 demands, since the capacitance C1 provides energy only to the microcontroller 29. The power consumption of the microcontroller is typically very small compared to the power consumption of typical peripheral unit, which means that the capacitance C1 can be much smaller and more inexpensive.

The node 28 can also be connected to a peripheral unit 47, which in this embodiment is a switch. This is connected to the microcontroller 29 via an input 77.

The base voltage on the bus, responsible for the power supply of the node and their peripheral units, may also be alternating. Some minor modifications of the principles for the DC case described above have to be performed. However, the basic principles are the same.

Figure 8:
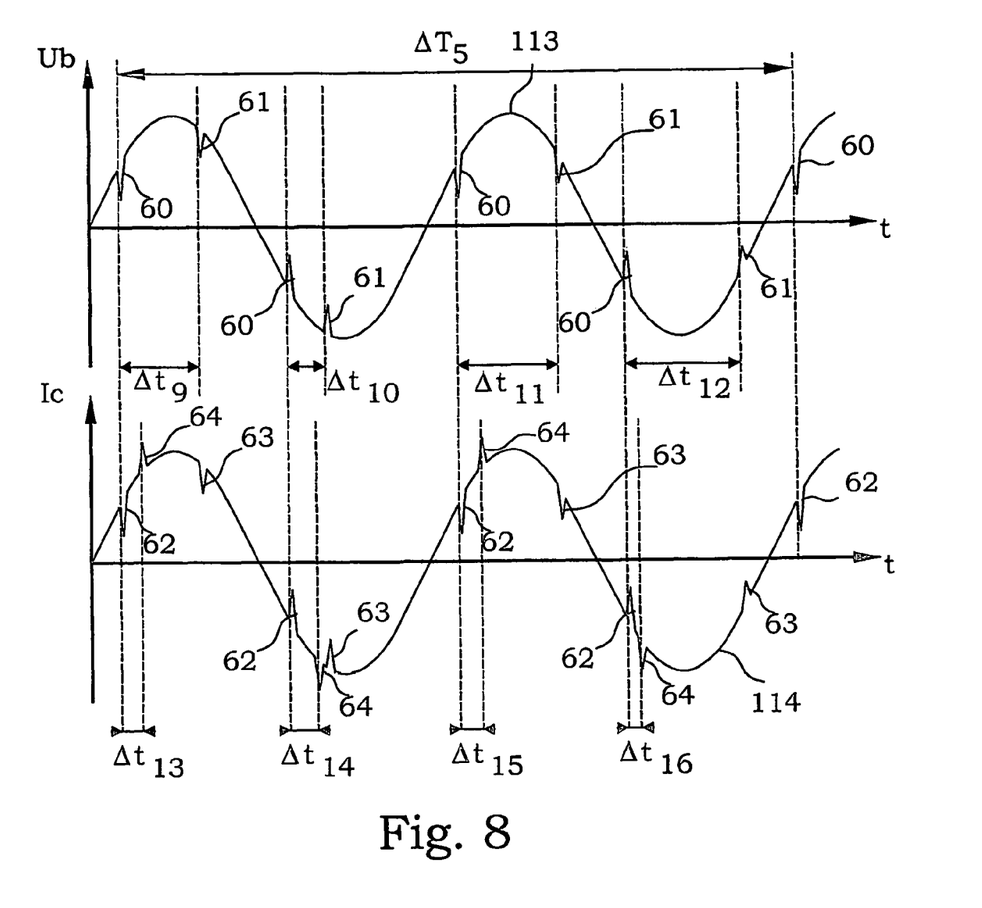
FIG. 8 is a diagram illustrating voltage and current pulses according to an embodiment of the present invention based on alternating voltages.

FIG. 8 illustrates curves 113, 114 of the voltage on the bus $U_b$ and the current $I_c$ from the central unit, respectively, when the energy transferred between the central unit and the nodes is based on a substantially sinusoidal alternating voltage. In this case, a limitation is introduced, since the possibility to introduce voltage pulses on the bus is limited during the time interval near the zero-crossing point of the alternating voltage. One embodiment avoiding such limitations is illustrated in FIG. 8. Here, two different types of main voltage pulses are present. A first type 60 occurs at the initial part of each half period of the alternating voltage. This first type 60 of main voltage pulse indicates the beginning of a main pulse period. A second type 61 indicates the end of the main pulse period. The maximum length of a main pulse period has in this embodiment to be less than the half period time of the alternating voltage. The time differences $\Delta t_9 - \Delta t_{12}$ represent the data units sent from the central unit out on the bus. As anyone skilled in the art realises, the data transfer rate will be somewhat lower in such a case.

As seen from FIG. 8, in the voltage curve $U_b$, every main pulse period is started by the central unit lowering the absolute value of the voltage for a short time in relation to the sinusoidal alternating voltage. This is done in the beginning of each half period of the sinusoidal alternating voltage. This means that the voltage pulse is a negative pulse during a half period of the alternating voltage presenting positive voltages, while the voltage pulse is a positive pulse during a half period of the alternating voltage presenting negative voltages. The central unit also terminates each main pulse period by again lowering the absolute value of the voltage for another short time. In the present example, the main pulses form a complete data frame. The last main pulse period $\Delta t_{12}$ is a calibration period. In the present example, the first three main pulse periods have the lengths of 7, 3 and 8 ms respectively, while the calibration period in this embodiment is 9 ms long. The total frame $\Delta T_5$ is constant and 56 ms long, which corresponds to a frequency of the alternating voltage of 35.7 Hz.

The current curve 114 of FIG. 8 illustrates the current flowing from the central unit. At the moments when a main voltage pulse is created, the absolute value of the current is decreased compared with the substantially sinusoidal alternating current flowing from the central unit. This reduction, causing current pulses 62, 63 is directly caused by the corresponding reduction in voltage 60, 61. This is in analogy with the DC case.

The main voltage pulse 60, 61 or the corresponding current pulses 62, 63 are to be detected in the nodes. Since an alternating base voltage is used, no threshold value can be used to determine the existence of a pulse. Instead, the derivative of the voltage or current can be used. The fast change of the voltage or current gives derivatives that differ significantly from the derivative of the base voltage and current, respectively.

An alternative approach is to compare the actual current or voltage with a calculated reference current or voltage. This reference current or voltage is provided to resemble the sinusoidal base voltage or current as good as possible.

Also in the alternating base voltage case, the nodes are allowed to send data back to the central unit. In FIG. 8, in each half period of the sinusoidal alternating current, there is also a short increase in absolute current, a current pulse 64, in relation to the sinusoidal alternating current. This increase is generated from one of the nodes on the bus and is according to the present invention used for sending data from the nodes to the central unit. The data values are as in the previous embodiments related to the time difference between the voltage pulse 60 in the beginning of each main pulse period and the current pulse 64 generated by the node. In FIG. 8, these data are represented by the time differences $\Delta t_{13}$ to $\Delta t_{16}$. In the present example, these time differences assume the values of 1, 2, 2 and 1 ms, respectively. The current pulses 64 generated by the nodes are in analogy with earlier embodiments detected in the central unit. The time differences are determined and associated to different data values.

Figure 9:
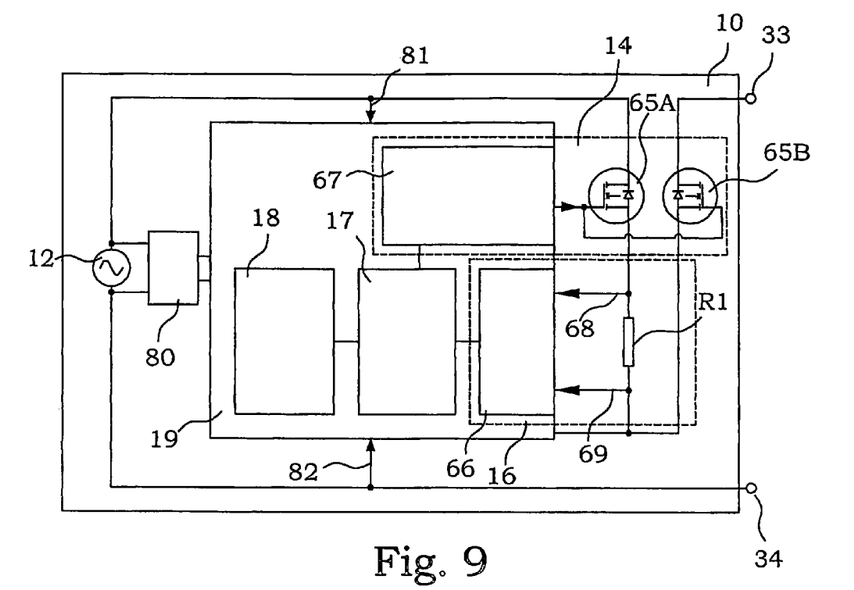
FIG. 9 is a block diagram of an embodiment of a central unit according to the present invention operating with alternating voltage supply.

FIG. 9 illustrates a block scheme of an embodiment of a central unit 10 according to the present invention driven by alternating voltage. The central unit 10 comprises a voltage source 12, in this embodiment an alternating voltage source. The voltage source 12 supplies power for the operation of the central unit itself as well as to the bus for further transfer to the nodes. The most essential part of the central unit 10 is as above a microcontroller 19. The microcontroller 19 is powered from the voltage source 12 via an AC/DC converter 80. The outputs on the DC side are galvanically separated from the inputs on the AC side, e.g. by means of a transformer included in the AC/DC converter. The output control signal means 67 in the microcontroller 19 is arranged to provide a signal to a transistor 65A and a transistor 65B. The transistors 65A, 65B are field effect transistors in this embodiment. They have the property that they conduct current in both directions when they are controlled to be in their low impedance state. When they are turned off, their inherent diode conducts current in one direction, but blocks the other. When the control signal makes the transistors 65A and 65B conductive in both directions, these transistors 65A, 65B and the shunt resistor R1 constitute a low impedance connection between the voltage source 12 and the bus over the bus terminals 33 and 34.

The transistors 65A, 65B can also be controlled by the output control signal means 67 to partially block and thereby lower the voltage on the bus. The voltage modulator 14 comprises in this embodiment the transistors 65A, 65B and the output control signal means 67 of the microcontroller 19, for generation of main voltage pulses.

The current that is provided out on the bus passes the shunt resistor R1. By connecting the input terminals 68, 69 of the voltage detecting means 66 in the microcontroller 19 to points on each side of the shunt resistor R1, a voltage drop over the shunt resistor R1 can be measured, which is proportional to the current on the bus. The current detector 16 comprises also in this embodiment the shunt resistor R1 and the voltage detecting means 66 of the microcontroller 19. The voltage detecting means 66 is in this embodiment arranged to be able to detect positive as well as negative pulses. Also in this embodiment, the microcontroller 19 further comprises the means 17 for detecting the time difference associated with the detected current pulses as well as the associating means 18, interpreting the time differences as data.

Inputs 81 and 82 are used by the microcontroller 29 for sensing the voltage from the voltage source 12.

Figure 10:
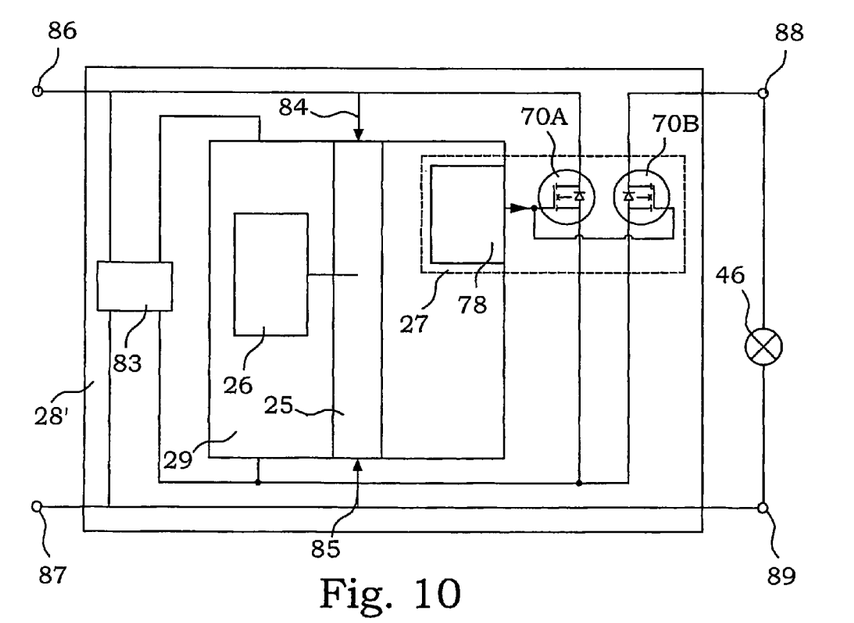
FIG. 10 is a block diagram of an embodiment of a node according to the present invention operating with alternating voltage supply.

FIG. 10 describes a node 28' intended to be connected to a bus according to the present invention, where the energy is transferred to the nodes and peripheral units in the form of an alternating voltage. The node 28' is connected to a peripheral unit 46 demanding alternating voltage supply, but with moderate stability requirements.

The microcontroller 29 is in this embodiment power supplied from the bus via an AC/DC converter 83. The outputs on the DC side are galvanically separated from the inputs on the AC side, e.g. by means of a transformer included in the AC/DC converter 83. Transistors 70A and 70B, both field effect transistors, are controlled by the output of the output control signal means 78 in analogy with FIG. 9. When these transistors 70A, 70B are controlled to conduct, they will form a low impedance connection between one of the bus terminals 86 of the node 28' and one peripheral unit terminal 88. (Another bus terminal 87 is constantly connected to another peripheral unit terminal 89.) The peripheral unit 46 can thus be operated by this low impedance directly from the alternating current of the bus.

The voltage pulse detector 25 is in this embodiment implemented in the microcontroller 29 and senses the voltage between voltage inputs 84, 85 directly connected to the bus terminals 86, 87. Deviations in voltage derivative as expected from the base alternating voltage indicate the occurrence of a voltage pulse, as discussed above, and time differences between such detected voltage pulses can be determined. In analogy with earlier embodiments, the interpreter 26 interprets the time difference as data.

When the node 28' is going to send data to the central unit, modifications of the current through the peripheral unit 46 are introduced. If the peripheral unit 46 is connected, i.e. if an alternating current flows through the peripheral unit 46, a signal to the transistors 70A, 70B to prohibit the current to flow during a short period of time will give rise to a negative current pulse in the general alternating current curve. If instead the peripheral unit 46 is not connected, i.e. the transistors 70A, 70B are already prohibiting any current to flow, a signal to the transistors 70A, 70B to allow current to flow will give rise to a positive current pulse. (The detector 16 in the central unit 10 is able to detect both types of pulses, see FIG. 9.)

Figure 11:
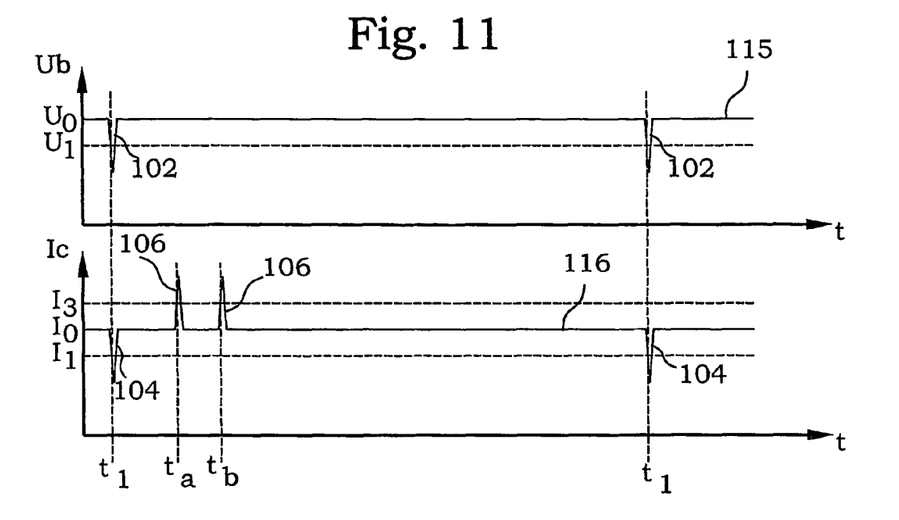
FIG. 11 is a diagram illustrating voltage and current pulses according to an embodiment of the present invention allowing simultaneous transferring of more than one current pulse within one and the same main pulse period.

One advantage with the present invention is that the use of a pulse position modulation enables a simultaneous data transfer from more than one node to the central unit. Since each transferred data value has its own position, an additional data value will not destroy the first one. In voltage 115 and current 116 curves of FIG. 11 it is illustrated how two nodes send data in the form of current pulses during one and the same main pulse period. A first node sends a data value corresponding to the time difference $t_a-t_1$, while a second node sends a data value corresponding to the time difference $t_b-t_1$. The central unit can detect both pulses 106 and can be arranged to determine the two different time differences. However, the central unit cannot determine from which node the data is sent. The central unit can neither determine if more than one node sends identical data.

The possibility for simultaneous sending of data from several nodes can nevertheless easily be used for transmitting e.g. an emergency stop message. If a data frame comprises a number of main pulse periods, one of these periods can be reserved for express messages in the "upbus" direction, i.e. from the nodes to the central unit. A very important message may have a reserved data value, i.e. that particular time separation is not allowed to use for any other express messages in this express message main pulse period. Such a very important message may be unique for a particular node or may be common for a set of nodes. The central unit knows in such a case implicitly from which node or set of nodes the message comes and may immediately take measures accordingly.

An extension of such ideas can also solve the lack of identity determination ability discussed further above. The data value can be composed, according to pre-established agreements, based both on the message content and the node address. The data value will in such a case implicitly comprise not only the message content, but also the node address. As an example, if a system comprises 4 nodes and each node may send a "0", a "1" or a "2", indicating e.g. three different status codes of operation of the associated peripheral units, 12 different data values can represent each combination of node and status code. The central unit can then by the data value itself determine from which node the data is sent and what the corresponding status is. In such a scheme, there will be no risk for two nodes to send an identical data value.

One aspect of the ability of sending simultaneous data from several nodes is the possibility for implementing a more extended express message function. Express messages are node messages that require fast reactions from the system and where normal node monitoring routines are insufficiently fast.

If a node needs to leave an express message, the central unit has to be made aware of this need. The node has thus to send a request for sending a longer or more information-rich message and also inform the central unit about which node is asking. When such a request is received, the central unit may issue a message to the (or several) concerned node(s) to allow for the actual message to be sent. One possibility to provide this is to reserve certain main pulse periods for transmission of such attention requests. Since most frames typically comprises at least one data unit related to an address of a receiving node or group of nodes, the corresponding main pulse period is difficult to use for normal data communication from a node to the central units, simply due to the fact that the nodes do not yet know which node is addressed. Such an addressing main pulse period may then in the "upbus" direction be use for express message requests. The central unit detects the express message request and may even in the successive frame address the node that put the request to allow for the actual express message to be sent. The response time for an express message can thereby be shortened considerably.

An example may illustrate this possibility more in detail. Let us assume that a model system comprises 64 indicators, controlled by the system, and 64 switches that control one of the indicators each. The switches are connected to one node each. When a switch is closed, a corresponding indicator somewhere else in the system should be activated or deactivated. The time from the closing of the switch to the activation of the indicator is called response time. In the model system, there is a request that the response time should not exceed 100 ms.

In a conventional system of this kind, the central unit typically addresses the nodes one at a time in a predetermined order. One node at a time is read to see if its switch has been closed (or opened). In this example, it takes 10 ms to address and read a node and its switch. The scanning of all 64 switches takes 64*10 ms=640 ms. This sequential scanning of nodes in the system is repeated periodically. When a switch is closed, it may in the worst case take 640 ms before the central unit discovers it. The response time may thereby be as high as 640 ms. Such response time increases in proportion to the number of nodes. The system can thus only manage to monitor a limited number of nodes before the response time becomes unreasonably long. The response time thus limits the ability of the system to handle many nodes with a short response time.

Figure 12:
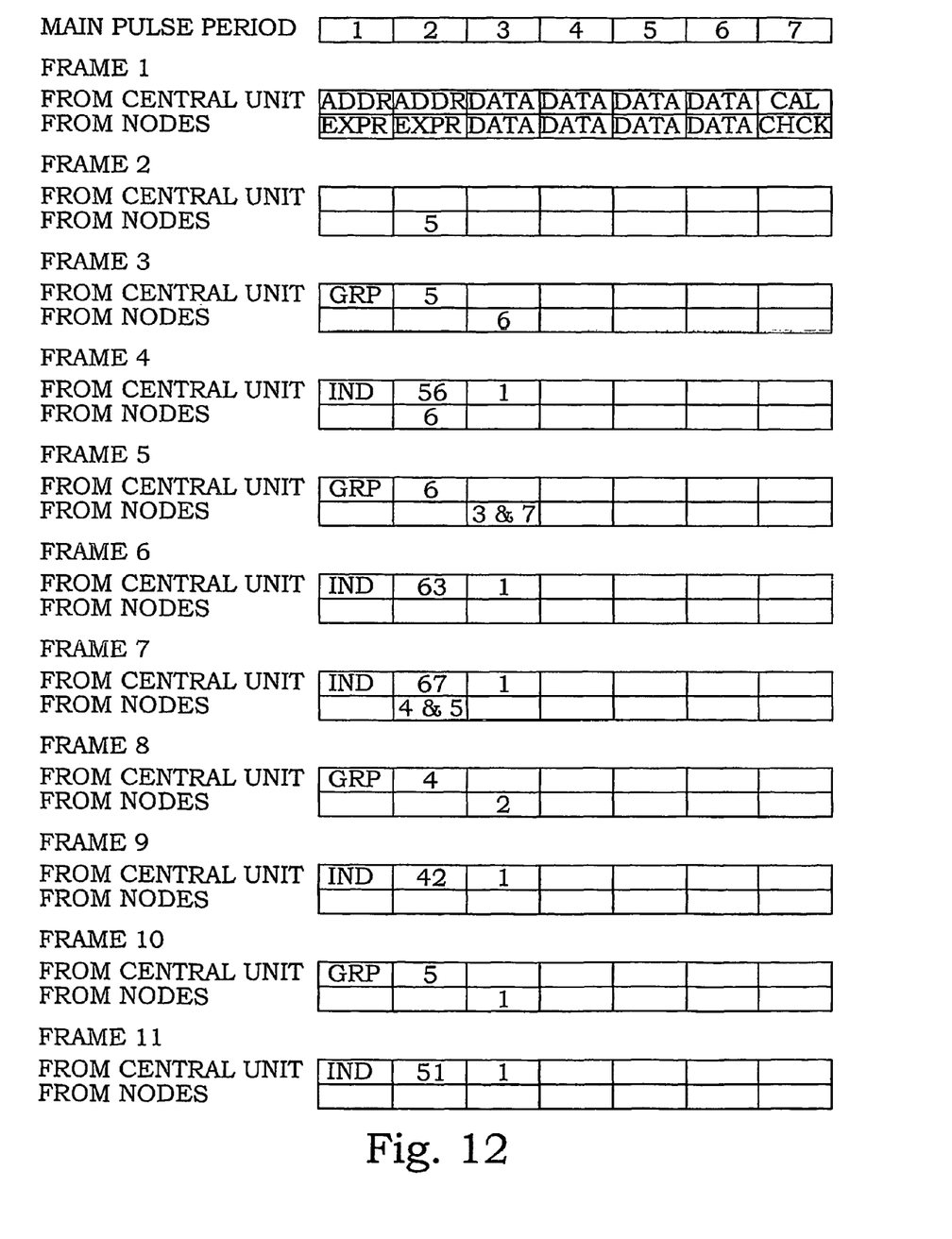
FIG. 12 is a schematic illustration of data frames transferred in an embodiment of an electrical system according to the present invention involving express messages.

According to the present invention, a procedure with express messages can be designed. In FIG. 12, a schematic description of a number of frames in a communication system according to the present invention is illustrated. In this example, every frame consists of 7 main pulse periods. Every main pulse period (except the calibration period) can assume 16 different lengths, which means that it can transfer 16 different values, i.e. information corresponding to 4 binary data bits. Each frame can thereby transfer 6×4 data bits, since the calibration period is not used. During each main pulse period, all nodes are allowed to send a current pulse on the bus corresponding to one out of 16 different time distances from the initial main pulse. This means that every main pulse period may transfer 4 binary data bits from a node to the central unit.

According to FIG. 12, every frame has been formatted in such a way that the central unit sends an address consisting of 2 data units corresponding to each 4 binary data bits and additional data consisting of 4 data units of each 4 binary data bits. Simultaneously, the nodes can send information to the central unit. The first two main pulse periods can be used for express message requests according to the present embodiment. The next four main pulse periods may be used by the addressed node to send back information to the central unit. The last main pulse period, corresponding to the calibration period, can be used for transferring checksums.

The express message periods are reserved for simultaneous sending of current pulses from several of the nodes. Normally, if nothing has happened, no data at all is sent from the nodes during the express message periods. If a switch of a node is closed, this node will generate a current pulse in the next frame to request an express message procedure. If the number of nodes is small enough, the node can simply send a representation of its address. Since the address is unique for each node, the central unit knows immediately which node is calling. In the present example 16 addresses can be represented in the first express message period and 16 in the second one, which means that 32 nodes can be identified immediately. However, in the present embodiment, 64 nodes are present, which means that a somewhat more complicated procedure has to be employed.

The 64 nodes of the present example are divided into 8 node groups with 8 nodes in each. If a switch of the 6th node in node group 5 is closed during time of the first data frame, this node will generate a current pulse in the next frame (frame 2). The current pulse will have a time difference that corresponds to the data value 5. The central unit detects this data value and in the successive data frame, frame 3, the central unit addresses collectively all nodes of node group 5 with the question "who is asking for an express message?". The node in question will respond to such a message by already in the same frame reply with a new current pulse, now in main pulse period 3. The time position of the current pulse corresponds to the data value 6, i.e. the 6th node of group 5. The central unit senses this data value and may already in the successive frame, frame 4, send an instruction to the node handling indicator 56 to turn it on. The response time thus becomes around 3 frames long, in the very worst case, almost 4 frames. However, if frame time was 10 ms, a response time never exceeds 40 ms, remarkably shorter than for conventional systems.

Also, even if the number of nodes to be monitored increases somewhat, the total response time will not increase. If each pulse corresponds to 4 binary bits and two main pulse periods are available for express messages, such a two-step procedure described above will be able to handle 2*16*16=512 nodes without increasing the response time.

Also if more than one switch is closed during one and the same frame period, this is easy to handle according to the present invention, due to the possibility of simultaneous transferring of data from different nodes. During frame 3, the switches of the 3rd and 7th node of node group 6 were closed. In frame 4, both these nodes generates a current pulse in the second main pulse period corresponding to a value of 6. The central unit detects the value of 6, but does not know that there are two switches closed, since no measure of the pulse amplitude is made. In analogy with the previous example, the central unit addresses all nodes of group 6 in the following frame (frame 5). Both node 3 and 7 will respond to this inquiry and generate one current pulse each in main pulse period 3 of frame 5. The central unit now detects two current pulses and realises that two switches are closed. In the two successive frames, frame 6 and 7, respectively, the corresponding indicators are order to be activated.

As another example, during frame 6, switches of the 2nd node of node group 4 and the 1st node of node group 5 are closed. In frame 7, both these nodes generate current pulses, but now at different times. The central unit detects two pulses corresponding to the values of 4 and 5, respectively. In frame 8, an inquiry to node group 4 is sent, whereby the 2nd node replies. In frame 9, the corresponding indicator is controlled to be activated. In frame 10, an inquiry to node group 5 is sent, whereby the 1st node replies. Finally, in frame 11, the corresponding indicator is controlled to be activated.

Anyone skilled in the art understands that more than two simultaneous node messages are possible to detect by the principles described above.

Figure 13:
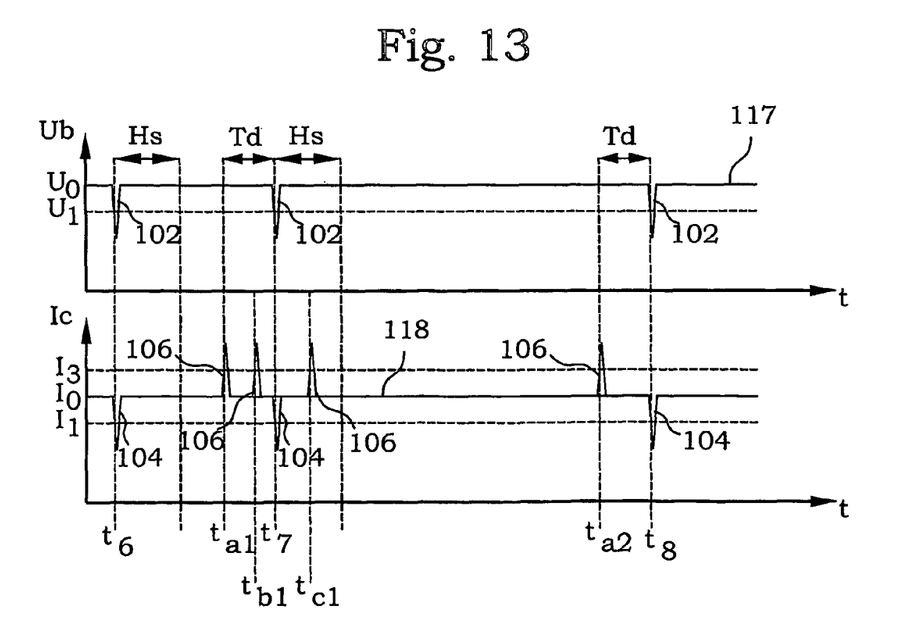
FIG. 13 is a diagram illustrating voltage and current pulses according to an embodiment of the present invention operating according to a reflection principle.

Other approaches for initiating data transfer from a node to the central unit are also possible. Yet another embodiment of the present invention is illustrated in FIG. 13 by bus voltage 117 and current 118 curves. At time $t_6$, the central unit generates a voltage pulse 102, at the same time reflected by a current pulse 104. At time $t_{a1}$, a node A sends a current pulse 106 on the bus. This pulse is detected by the central unit and the time difference from $t_6$ is determined. As above, this corresponds to a data value sent by node A.

At time $t_7$, the central unit creates a new voltage pulse 102 on the bus, depending on the reception time $t_{a1}$ of the node A pulse. In the present embodiment, $t_7$ is situated at a predetermined time distance Td from $t_{a1}$. The distance in time between $t_6$ and $t_7$ is thus also dependent on the distance between $t_6$ and $t_{a1}$, i.e. dependent on the data value transmitted by node A. This "reflected" data value can thus, within the same main pulse interval, be detected by all nodes by processing the time difference between $t_6$ and $t_7$.

In alternative embodiments, the time difference $t_7-t_6$ can be dependent on the time difference $t_{a1}-t_6$ in other ways, as long as $t_7-t_6$ is longer. The relation between $t_7-t_6$ and $t_{a1}-t_6$ also have to be a one-to-one relation, so that each $t_7-t_6$ value has a unique correspondence in a $t_{a1}-t_6$ value.

When a node that has sent out a data value to the central unit and recognises the same value returned by the central unit in the very same main pulse, the node interprets this in the present embodiment as it has been allowed to continue to send data. The node can thereby continue sending data, e.g. at time $t_{a2}$, until e.g. a new calibration pulse has been received.

The detection of a node data value automatically prohibits further data values to be detected. In FIG. 13, another node B, sends a current pulse at $t_{b1}$. This pulse occurs later than $t_{a1}$, and since the central unit already is in progress for reflecting a new voltage pulse, the current pulse at $t_{b1}$ is ignored. When the reflected voltage pulse at $t_7$ is created at the bus, node B will immediately realise that another node was faster in sending a data value and node B refrains to send any more data until e.g. next calibration pulse.

As before, the current pulses can not be too close to the main voltage pulse 102. A time period Hs has to be ended before any current value is detected. This means that the current pulse at $t_{c1}$ is ignored.

The present embodiment opens up for an arbitration between different nodes, according to known methods as such. The first (or lowest) data value wins, and the corresponding node can utilise the rest of the frame for its purposes. The other nodes have to wait for the next frame.

The arbitration using reflection can also be performed in multiple steps during successive main pulses. An example will be described below. An assumption is made that two nodes send a current pulse at the same time instant. The central unit will thereby reflect this data value, and both nodes will interpret this as if their data value has got priority to the bus. Both nodes will therefore continue to send during the next main pulse. During this pulse, the two nodes may send different values, i.e. at different times. This means that only one of the nodes will get its data value reflected during the second main pulse. According to the present embodiment, the node that does not get its value reflected, interrupts its sending during the remaining part of the frame, while the node that has its value reflected will continue and has prevailed over the other node. According to the same principles, arbitration can take place during the entire frame having two or more nodes participating. As soon as differing data values are transmitted, at least one node will interrupt its sending In the earlier description, a new main voltage pulse occurs after at least a time period of Hs+Hn, but in the present embodiment, the successive main pulse may occur within the period Hn. No time has to be reserved for Hc, which means that the same amount of data can be sent from the nodes to the central unit in a shorter time period, by using the reflection method.

The reflection method thus has three advantages. First, all nodes on the bus can immediately read what another node has sent. Secondly, an immediate arbitrating can be performed between concurrent messages from the nodes. Thirdly, the same amount of data can be transmitted in a shorter time period, i.e. the communication speed increases.

Arbitrating means that the node that has the highest priority, in the present embodiment, the node that first sends a valid current pulse, achieves preference to the bus. This is in a typical case an advantage, but may in certain situations also be a risk. If an amount of highly prioritised messages ask for preference to the bus, this may totally block low-prioritised messages. The situation that low prioritised messages never or at least very seldom reach their targets may of course create problems in the bus system. One embodiment of the present invention is therefore arranged such that the central unit is controlled to let a certain ratio of low-priority messages pass, even when highly prioritised messages should have occupied the entire bus capacity. The reasoning can be implemented both in a reflection embodiment or in other embodiments.

The central unit detects the data carrying current pulses from the nodes. The presumption that these data should reach other nodes is that the central unit according to any of the previous embodiments sends the information as voltage pulses. The central unit is thus in a position to decide which messages that should be prioritised and be forwarded as voltage pulses. The central unit may e.g. count all messages having a certain priority that are sent during a certain time period. According to the invention, this condition could be utilised in such a way that highly prioritised messages are not forwarded on the bus if they have occupied a too large portion of the bus capacity. The central unit may here instead send low-priority messages during a certain part of the bus capacity. A total or long-time blocking of low-priority messages can thereby be avoided.

Figure 14:
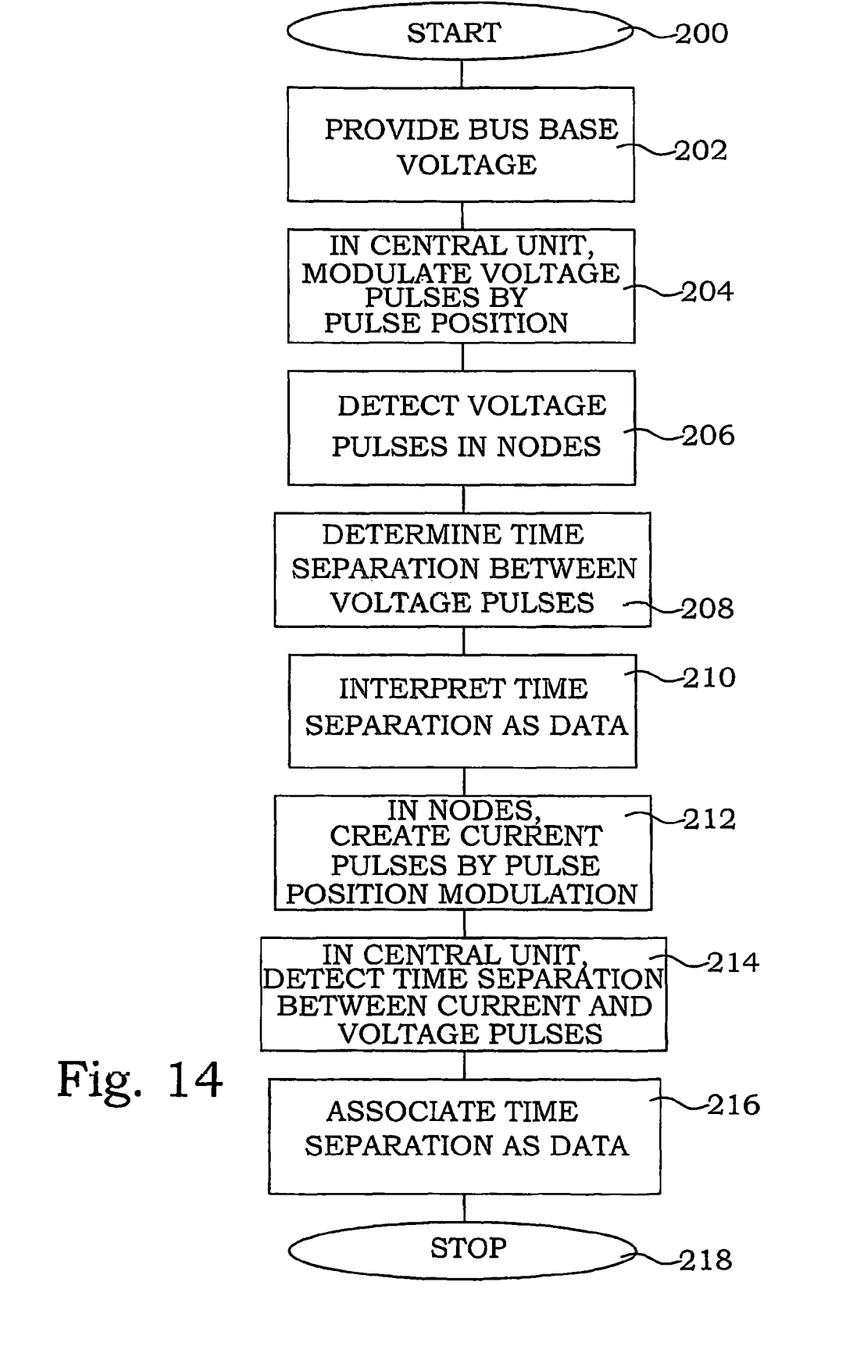
FIG. 14 is a flow diagram illustrating an embodiment of a method according to the present invention.

In FIG. 14, a flow diagram illustrating an embodiment of a procedure according to the present invention is shown. The procedure starts in step 200. In step 202, a voltage is provided between the conductors in a bus connecting a central unit and a number of nodes. In step 204, voltage pulses are modulated onto the bus by the central unit. The time difference between successive voltage pulses takes one of n distinct predetermined values, where n>2. The modulated voltage pulses are detected in the nodes in step 206, whereupon time separations of the detected pulses are determined in step 208 and associated in step 210 to a corresponding data quantity. Steps 204-210 correspond to a data transfer from the central unit to the nodes.

In step 212, current pulses are created by at least one node on the bus, representing data intended for the central unit. The time difference between such a current pulse and the closest previous voltage pulse is determined by the central unit in step 214, and takes one of k distinct predetermined values, where k>2. In step 216 such a time separation is associated with a data quantity. Steps 212-216 correspond to a data transfer from the nodes to the central unit. The procedure is ending in step 218.

The above flow diagram should not be interpreted in a strictly sequential manner. The step 202 and the step groups 204-210 and 212-216 should instead be understood as essentially independent and simultaneous part procedures.

It will be understood by those skilled in the art that various modifications and changes may be made to the present invention without departure from the scope thereof, which is defined by the appended claims. It will also be understood by those skilled in the art that various combinations of embodiments described above are favourable to implement.

The invention claimed is:

1. Electrical system comprising:
   a central unit;
   more than one node; and
   bus arrangement connecting the more than one node and the central unit for transfer of data there between;
   the bus arrangement having a single conductor pair;
   the central unit comprising a voltage supply arranged to provide a voltage between the conductors in the conductor pair;
   the central unit further comprising a voltage modulator, arranged to modulate at least two successive voltage pulses onto the conductor pair representing data to be transferred from the central unit to the more than one node;
   whereby a time separation between the successive voltage pulses takes one of n distinct predetermined first values, where n>2, each of the n distinct predetermined values corresponding to a predetermined data quantity;
   the more than one node comprising a detector of the modulated voltage pulses or quantities directly related thereto; and
   the more than one node further comprising an interpreter, interpreting the detected modulated voltage pulses as transferred data;
   the interpreter in turn comprises means for determining the time separation between the successive voltage pulses and means for associating the determined time separation with a corresponding data quantity,
   the more than one node further comprising means for creating a current pulse on the conductor pair representing data to be transferred from a respective node to the central unit;
   whereby a time separation between the current pulse and the closest preceding voltage pulse takes one of k distinct predetermined values, where k>2, each of the k distinct predetermined values corresponding to a predetermined data quantity; and
   the central unit further comprising:
   detector for the current pulses;
   means for determining the time separation between the current pulse and the closest preceding voltage pulse; and
   means for associating, in the central unit, the determined time separation between the current pulse and the closest preceding voltage pulse with a corresponding data quantity.

2. Electrical system according to claim 1, wherein the more than one node are arranged to send data to the central unit within the same time period between two successive voltage pulses.

3. Electrical system according to claim 1, wherein the more than one node further comprise means for extracting electrical power from the voltage between the conductor pair.

4. Electrical system according to claim 3, further comprising a peripheral unit associated with the more than one node, said peripheral unit being connected directly between the conductor pair via only switching means.

5. Method of communication in an electrical system having a central unit connected to more than one node by a common bus arrangement with a single conductor pair, comprising the steps of:
   providing a voltage between the conductors in the conductor pair;
   modulating, in the central unit, at least two successive voltage pulses on the conductor pair representing data to be transferred from the central unit to the more than one node;
   whereby a time separation between the successive voltage pulses takes one of n distinct predetermined first values, where n>2, each of the n distinct predetermined values corresponding to a predetermined data quantity;
   detecting the modulated voltage pulses or quantities directly related thereto in the more than one node; and
   interpreting, in the more than one node, the detected modulated voltage pulses as transferred data, by the part steps of:
   determining the time separation;
   associating the determined time separation with a corresponding data quantity,
   creating, in at least one of the more than one node, a current pulse on the conductor pair representing data to be transferred from the at least one of the more than one node to the central unit;
   whereby a time separation between the current pulse and the closest preceding voltage pulse takes one of k distinct predetermined values, where k>2, each of the k distinct predetermined values corresponding to a predetermined data quantity;
   detecting the current pulses in the central unit;
   determining, in the central unit, the time separation between the current pulse and the closest preceding voltage pulse; and
   associating, in the central unit, the determined time separation between the current pulse and the closest preceding voltage pulse with a corresponding data quantity.

6. Method according to claim 5, wherein the more than one node send data to the central unit within the same time period between two successive voltage pulses.

7. Method according to claim 5, comprising the further step of supplying electrical power to the more than one node from the voltage between the conductor pair.

8. Method according to claim 5, comprising the further step of sending calibration data from the central unit to the more than one node as two voltage pulses having a time separation being distinct in relation to time separations representing other data than calibration data.

9. Method according to claim 8, wherein said time separation representing said calibration data is larger than time separations representing other data than calibration data.

10. Method according to claim 8, wherein said time separation representing said calibration data is situated within a predetermined range.

11. Method according to claim 8, comprising the further step of calibrating a node time reference of at least one of the more than one node based on a measured value of the voltage pulse time separation of said calibration data.

12. Method according to claim 8, wherein the data to be transferred is sent in data frames, whereby the method comprises the further step of synchronizing the start of each data frame to the m:th voltage pulse following a calibration data period.

13. Method according to claim 12, wherein a time separation between the start of two successive data frames is equal to a predetermined synchronizing value, whereby the method comprises the further steps of calibrating node time reference of at least one of the more than one node based on a measured value of the time separation between the start of two successive data frames and additionally based on the predetermined synchronising value.

14. Method according to claim 5, wherein the data to be transferred is sent in data frames, in which at least one data position of data transferred from at least one of the more than one node to the central unit is assigned as an express data position, whereby at least one of the more than one node sends data associated with an express message in the express data position.

15. Method according to claim 14, wherein at least two of the more than one node send data associated with an express message in the same express data position.

16. Method according to claim 14, wherein said data associated with an express message comprises an identification of the node sending said data associated with an express message.

17. Method according to claim 5, comprising the further step of reflecting data sent from a node to the central unit by data sent from the central unit within the same main period, said data sent from the central unit having a unique correspondence with said data sent to the central unit.

18. Method according to claim 17, comprising the further step of allowing a node originally sending the reflected data to continue sending data within a remaining part of a present frame.

* * * * *